United States Patent
Lange

(10) Patent No.: US 10,779,191 B1
(45) Date of Patent: Sep. 15, 2020

(54) DATA COMPRESSION TECHNIQUES

(71) Applicant: Lynq Technologies, Inc., Brooklyn, NY (US)

(72) Inventor: Justin Lange, New York, NY (US)

(73) Assignee: Lynq Technologies, Inc., Brooklyn, NY (US)

( * ) Notice: Subject to any disclaimer, the term of this patent is extended or adjusted under 35 U.S.C. 154(b) by 0 days.

(21) Appl. No.: 16/363,827

(22) Filed: Mar. 25, 2019

Related U.S. Application Data

(60) Provisional application No. 62/648,159, filed on Mar. 26, 2018.

(51) Int. Cl.
| | | |
|---|---|---|
| *H04W 24/00* | (2009.01) | |
| *H04W 28/06* | (2009.01) | |
| *H04W 4/021* | (2018.01) | |
| *H04W 88/08* | (2009.01) | |
| *G06F 16/487* | (2019.01) | |
| *H04W 4/029* | (2018.01) | |

(52) U.S. Cl.
CPC .......... *H04W 28/06* (2013.01); *G06F 16/487* (2019.01); *H04W 4/021* (2013.01); *H04W 4/029* (2018.02); *H04W 88/08* (2013.01)

(58) Field of Classification Search
None
See application file for complete search history.

(56) References Cited

U.S. PATENT DOCUMENTS

| | | |
|---|---|---|
| 8,255,393 B1 | 8/2012 | Yu et al. |
| 8,350,758 B1 | 1/2013 | Parvizi et al. |
| 9,084,122 B2 | 7/2015 | Gao et al. |
| 9,485,747 B1 | 11/2016 | Rodoper et al. |
| 9,674,664 B1 | 6/2017 | Laursen et al. |
| 10,080,131 B2 | 9/2018 | Goo et al. |
| 10,616,857 B1 * | 4/2020 | Lange .................. H04W 4/023 |
| 2006/0200843 A1 | 9/2006 | Morgan et al. |
| 2006/0241853 A1 | 10/2006 | Gadler |
| 2007/0004427 A1 | 1/2007 | Morgan et al. |
| 2008/0176583 A1 | 7/2008 | Brachet et al. |
| 2010/0134299 A1 | 6/2010 | Fitzgerald et al. |
| 2010/0138297 A1 | 6/2010 | Fitzgerald et al. |
| 2010/0317392 A1 | 12/2010 | Davis et al. |

(Continued)

*Primary Examiner* — Phuongchau Ba Nguyen
(74) *Attorney, Agent, or Firm* — Ryan, Mason & Lewis, LLP

(57) ABSTRACT

Methods, apparatus, and processor-readable storage media for data compression are provided herein. An example computer-implemented method includes compressing a first portion of geo-location information attributed to each of one or more access points via one or more hash reduction techniques; converting a second portion of geo-location information attributed to each of the access points to polar coordinates; converting, for each of the access points, the polar coordinates attributed thereto to a position on a one-dimensional data structure configured to have one or more predetermined geometric properties; generating a compressed access point geo-location data output comprising the compressed at least first portion of geo-location information attributed to each of the access points and the position on the one-dimensional data structure attributed to each of the access points; and outputting the compressed access point geo-location data output to a user device.

20 Claims, 3 Drawing Sheets

(56) References Cited

U.S. PATENT DOCUMENTS

| | | |
|---|---|---|
| 2011/0070863 A1 | 3/2011 | Ma et al. |
| 2013/0091146 A1 | 4/2013 | Stanger |
| 2013/0253825 A1 | 9/2013 | Xu |
| 2014/0240350 A1 | 8/2014 | Chen et al. |
| 2014/0342755 A1 | 11/2014 | Youssef et al. |
| 2016/0165570 A1 | 6/2016 | Kim et al. |
| 2016/0192123 A1 | 6/2016 | Lim |
| 2016/0247175 A1 | 8/2016 | Milton et al. |
| 2016/0328698 A1 | 11/2016 | Kumaraguruparan et al. |
| 2017/0176583 A1 | 6/2017 | Gulden et al. |
| 2017/0235743 A1 | 8/2017 | Kim et al. |
| 2017/0346776 A1 | 11/2017 | Valla |
| 2017/0346820 A1 | 11/2017 | Valla |
| 2017/0366956 A1 | 12/2017 | Yoshida et al. |
| 2018/0176859 A1 | 6/2018 | Haines et al. |
| 2018/0357673 A1 | 12/2018 | Dumas |
| 2018/0367947 A1 | 12/2018 | Kim et al. |
| 2019/0075130 A1 | 3/2019 | Petry et al. |

* cited by examiner

DATA COMPRESSION TECHNIQUES

CROSS-REFERENCE TO RELATED APPLICATIONS

The present application claims priority to U.S. Provisional Application Ser. No. 62/648,159, filed Mar. 26, 2018, which is incorporated by reference herein. Additionally, the present application is related to U.S. patent application Ser. No. 16/363,787 entitled "Determining a Set of Access Points in Response to a Geo-Location Request," and U.S. patent application Ser. No. 16/363,832 entitled "Local Determination of Geo-Location Data by User Devices," both of which are filed concurrent herewith and both of which are incorporated by reference herein.

FIELD

The field relates generally to information technology, and more particularly to data processing and transmission.

BACKGROUND

Geo-location information, with respect to users and devices, is increasingly sought-after in multiple technological settings and environments. One example mechanism for determining geo-location information includes access point geo-location techniques. Conventional access point geo-location approaches commonly include utilizing a server-maintained database of access points (for example, hardware devices such as Wi-Fi routers). Typically, a user device that is requesting its geo-location, will scan and/or monitor a surrounding area in an attempt to detect one or more access points, the identities of which the user device will transmit to the server in conjunction with the geo-location request. The above-noted identities can take the form of unique serial numbers associated with the access points (for example, media access control (MAC) addresses), which can be read by other devices (such as the user device in question). The server will commonly then compare the provided information in the request to the information stored in its database (which typically includes latitude and longitude values associated with each of the access points). Based on this comparison, the server will generally respond to the user device with an estimated geo-location of the user device, wherein the estimation is made relative to the particular access points provided by the user device in conjunction with the request.

However, such a response is commonly large in terms of data to be transmitted, typically including a full longitude value, a full latitude value, and a confidence interval. Moreover, each time that the user device seeks to update or determine its geo-location, the user device must submit a new request to the server, and the above-described request-response transmission sequence must be carried out. Accordingly (and disadvantageously), each such request-response transmission sequence requires time on the network by/for the user device to carry out the sending of the request (and receiving of the response). Also, each such request-response transmission sequence requires power consumption by the user device, depleting battery capacity in a non-trivial manner. Further, there are commonly insignificant data costs associated with sending each request and receiving each response.

Accordingly, a need exists for access point geo-location techniques that reduce network costs, power costs, and data costs for requesting devices.

SUMMARY

Illustrative embodiments of the disclosure provide techniques for data compression. An exemplary computer-implemented method includes compressing at least a first portion of geo-location information attributed to each of one or more access points via one or more hash reduction techniques, wherein an access point comprises a networking hardware device having identifiable geo-location properties. Such a method also includes converting at least a second portion of geo-location information attributed to each of the one or more access points to polar coordinates, and converting, for each of the one or more access points, the polar coordinates attributed thereto to a position on a one-dimensional data structure configured to have one or more predetermined geometric properties. Further, such a method additionally includes generating a compressed access point geo-location data output comprising (i) the compressed at least first portion of geo-location information attributed to each of the one or more access points and (ii) the position on the one-dimensional data structure attributed to each of the one or more access points, and outputting the compressed access point geo-location data output to at least one user device.

Illustrative embodiments can provide significant advantages relative to conventional access point geo-location approaches. For example, challenges associated with latency and costs are overcome through the generation and transmission to the requesting device of compressed access point geo-location data, thereby enabling the requesting device to subsequently carry out additional geo-location determinations locally.

These and other illustrative embodiments described herein include, without limitation, methods, apparatus, networks, systems and processor-readable storage media.

and

Figure 3:
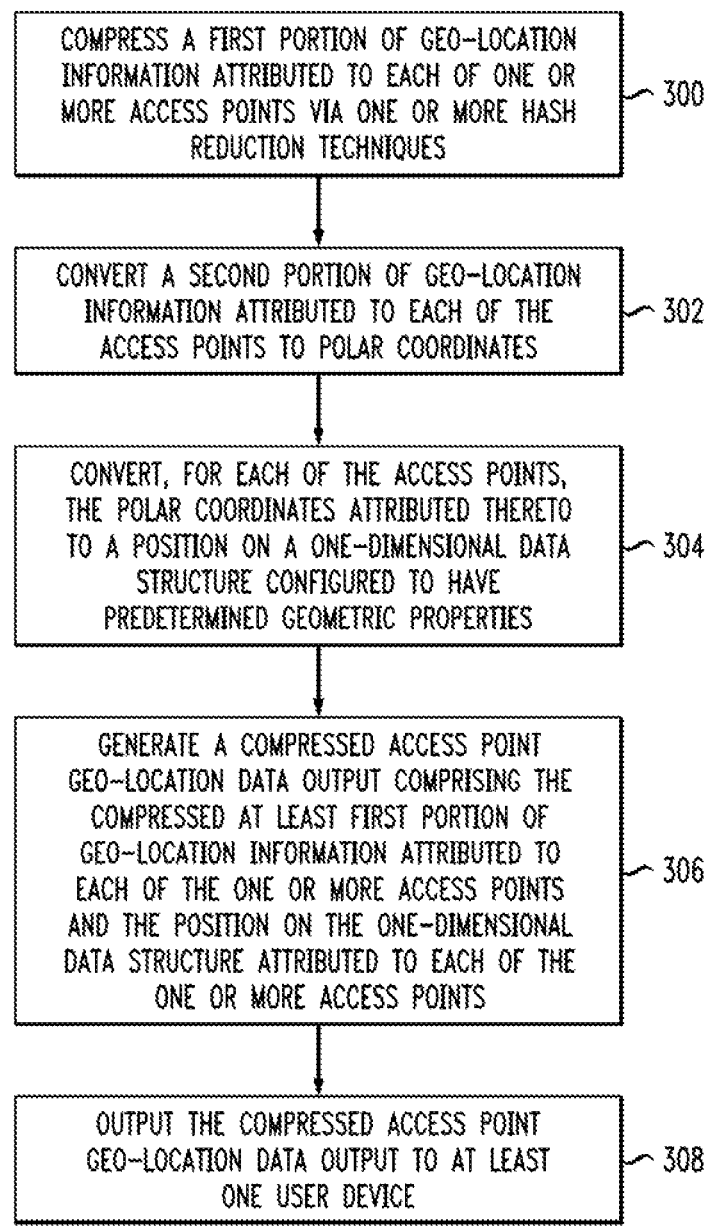

FIG. 3 is a flow diagram of a process for data compression in an illustrative embodiment.

DETAILED DESCRIPTION

As detailed herein, one or more embodiments include access point geo-location (occasionally referred to herein simply as "location") data compression techniques and uses thereof. As used herein, an access point (which can also be referred to as a wireless access point) refers to a networking hardware device which facilitates a separate device (such as, for example, a Wi-Fi device) to connect to a particular network, or a networking hardware device which may be uniquely identified and whose geo-spatial properties are likely to be known or inferred by the server, even if this networking hardware device does not facilitate any separate device to connect to a particular network (for example, a beacon). As noted herein, one example of an access point can include a Wi-Fi router, stationary ZigBee devices, cellular data towers, machine-to-machine (M2M) networking equipment, LTE-CATM towers, narrowband-Internet of Things (NB-IOT), etc.

Example and/or illustrative embodiments will be described herein with reference to exemplary networks and associated computers, servers, network devices or other types of processing devices. It is to be appreciated, however, that the invention is not restricted to use with the particular illustrative network and device configurations shown. By way of example, the term "network" as used herein is intended to be broadly construed, so as to encompass, for example, any system comprising multiple networked processing devices.

Figure 1:
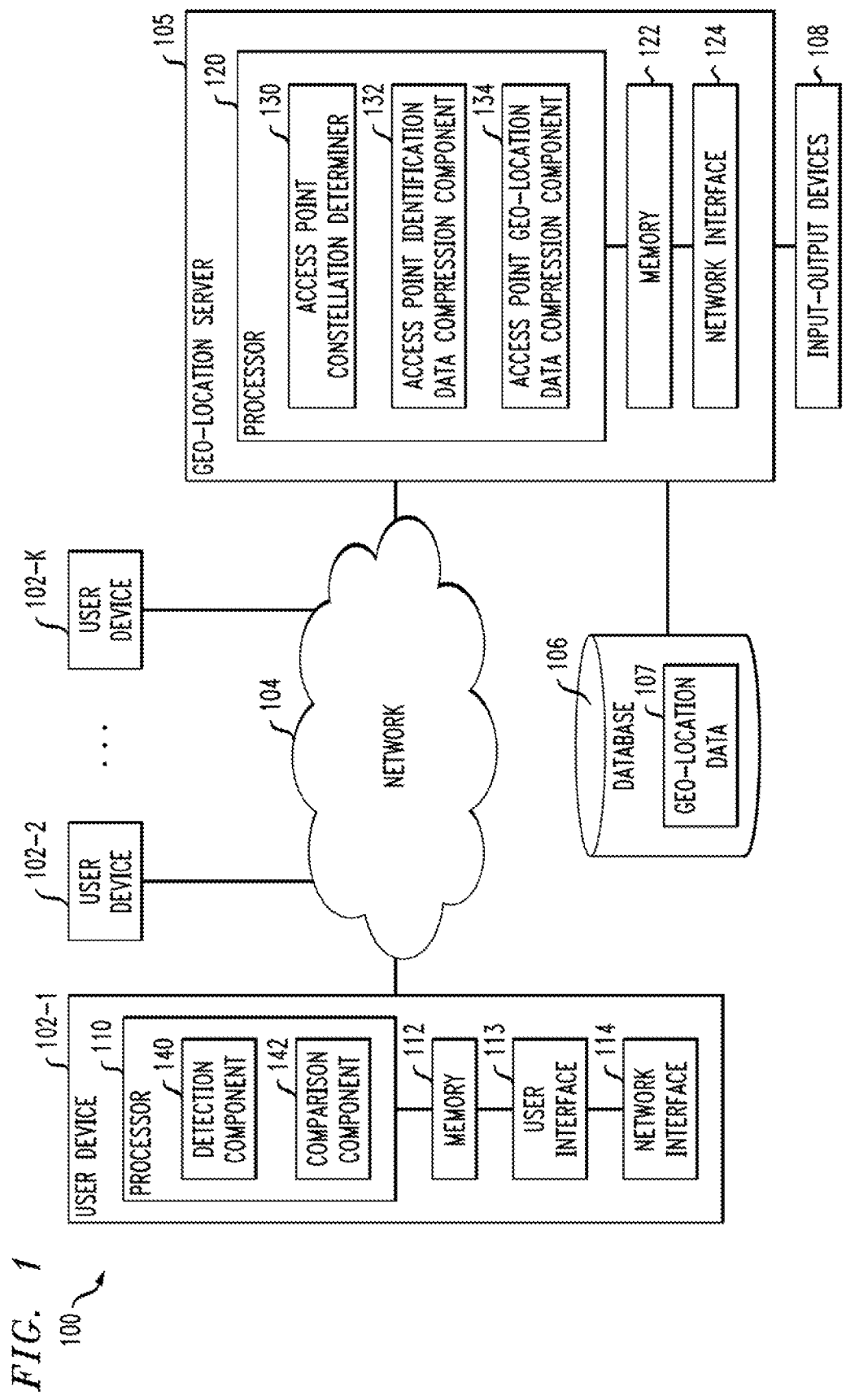
FIG. 1 is a block diagram of a network configured for access point geo-location compression in an example embodiment.

FIG. 1 shows a network 100 configured in accordance with an example embodiment. The network 100 includes a plurality of user devices 102-1, 102-2, . . . 102-K, collectively referred to herein as user device(s) 102 (and also occasionally referred to herein as "requesting device" or simply as "device"). The user devices 102 are coupled to a network 104, where the network 104 in such an embodiment is assumed to represent a sub-network or other related portion of the larger network 100. Accordingly, elements 100 and 104 are both referred to herein as examples of "networks," but element 104 is assumed to be a component of element 100 in the context of the FIG. 1 embodiment. Also coupled to the network 104 is geo-location server 105 (also occasionally referred to herein simply as "server").

The user devices 102 can include, for example, location data tracking hardware devices, as well as mobile telephones or smart phones, laptop computers, tablet computers, desktop computers or other types of computing devices. The user devices 102, as illustrated in FIG. 1, can connect (wirelessly or via a hard-wired connection) to the geo-location server 105 via network 104. Accordingly, an example embodiment such as depicted in FIG. 1 includes a location data tracking hardware device (102) wirelessly connected to geo-location server 105 via network 104.

In the example embodiment illustrated in FIG. 1, the user device 102 includes a processor 110 coupled to a memory 112, a user interface 113, and a network interface 114.

The processor 110 can include, for example, a microprocessor, a microcontroller, an application-specific integrated circuit, a field-programmable gate array or other type of processing circuitry, as well as portions or combinations of such circuitry elements.

The memory 112 can include, for example, random access memory (RAM), read-only memory (ROM) or other types of memory, in any combination. The memory 112 and other memories disclosed herein can also be viewed as examples of processor-readable storage media, which can store executable computer program code and/or other types of software programs.

Examples of such processor-readable storage media can include, by way merely of example and not limitation, a storage device such as a storage disk, a storage array or an integrated circuit containing memory, as well as a wide variety of other types of computer program products. The term "processor-readable storage media" as used herein should be understood to exclude transitory, propagating signals.

The user interface 113 can be implemented, for example, to control communication between the user device 102 and the geo-location server 105, as well as to display information to a user. For example, in one or more embodiments, the user interface 113 can display information to a user of the device 102 by way of displaying graphical information of varying size based on the distance between the user device 102 and one or more other user devices in the same group (that is, devices paired with the user device of the user in question). By way of further example, in at least one example, a dot or circle (that is representative of a second user device) displayed via the user interface 113 can increase in size (on the user interface 113) as the second user device moves closer to the user device in question. Similarly, in such an embodiment, the dot or circle (that is representative of the second user device) displayed via the user interface 113 can decrease in size (on the user interface 113) as the second user device moves farther away from the user device in question.

The network interface 114 allows the user device 102 to communicate over the network 104 with the geo-location server 102, and can include, for example, one or more conventional transceivers.

Additionally, processor 110 can also include a detection component 140 and a comparison component 142. It is to be appreciated that this particular arrangement of modules 140 and 142 illustrated in the processor 110 of the FIG. 1 embodiment is presented by way of example only, and alternative arrangements can be used in one or more other embodiments. For example, the functionality associated with the modules 140 and 142 in other embodiments can be combined into a single module, or separated across a number of modules. By way of further example, multiple distinct processors can be used to implement different ones of the modules 140 and 142, or portions thereof.

Also, at least portions of the detection component 140 and comparison component 142 can be implemented at least in part in the form of software that is stored in memory 112 and executed by processor 110.

Further, an example process utilizing detection component 140 and comparison component 142 of the user device in network 100 is described herein in greater detail.

Additionally, the user devices 102 can be coupled to one or more additional devices such as other location data tracking hardware devices, mobile telephones or smart phones, laptop computers, tablet computers, desktop computers or other types of computing devices.

The user devices 102, in one or more embodiments, can be coupled to respective user devices associated with a particular group, company, organization or other enterprise. Numerous other operating scenarios involving a wide variety of different types and arrangements of processing devices and networks are possible, as will be appreciated by those skilled in the art.

Also, it is to be appreciated that the term "user" herein is intended to be broadly construed so as to encompass, for example, human, hardware, software or firmware entities, as well as various combinations of such entities.

Referring again to FIG. 1, in at least one embodiment, the geo-location server 105 in the FIG. 1 embodiment can be implemented using at least one processing device. Each such processing device can include at least one processor and at least one associated memory, and can implement one or more functional software modules or components for controlling certain features of the geo-location server 105.

In the example embodiment illustrated in FIG. 1, the geo-location server 105 includes a processor 120 coupled to a memory 122 and a network interface 124.

The processor 120 can include, for example, a microprocessor, a microcontroller, an application-specific integrated circuit, a field-programmable gate array or other type of processing circuitry, as well as portions or combinations of such circuitry elements.

The memory 122 can include, for example, RAM, ROM or other types of memory, in any combination. The memory 122 and other memories disclosed herein can also be viewed as examples of processor-readable storage media, which can store executable computer program code and/or other types of software programs.

Examples of such processor-readable storage media can include, by way merely of example and not limitation, a storage device such as a storage disk, a storage array or an integrated circuit containing memory, as well as a wide variety of other types of computer program products.

The network interface 124 allows the geo-location server 105 to communicate over the network 104 with the user devices 102, and can include, for example, one or more conventional transceivers.

The network 104 is assumed to include a portion of a global computer network such as the Internet, although other types of networks can be part of the network 100, including a wide area network (WAN), a local area network (LAN), a satellite network, a telephone or cable network, a cellular network, a wireless network such as a LoRa, LoRa-WAN, SigFox or other LPWAN network, a Wi-Fi, or WiMAX network, or various portions or combinations of these and other types of networks. Also, the network 100, in one or more embodiments, can include combinations of different types of networks, each including processing devices configured to communicate using internet protocol (IP) or other related communication protocols.

The geo-location server 105 has an associated database 106 configured to store data related to location and/or positioning requests and responses. The database 106 more particularly stores geo-location data 107, which can include geo-location data pertaining to user devices 102, access points, etc., as well as corresponding identification data associated with such user devices, access points, etc.

In at least one embodiment, database 106 can be implemented using one or more storage systems associated with the geo-location server 105. Such storage systems can comprise any of a variety of types of storage including network-attached storage, storage area networks, direct-attached storage and distributed direct-attached storage, as well as combinations of these and other storage types, including software-defined storage.

Also associated with the geo-location server 105 are input-output devices 108, which can include, by way merely of example, keyboards, displays or other types of input-output devices in any combination. Such input-output devices can be used to support one or more user interfaces (UIs) to the geo-location server 105, as well as to support communication between the geo-location server 105 and other related systems and devices not explicitly illustrated in FIG. 1.

Also pertaining to geo-location server 105, the processor 120 can also include access point constellation determiner 130, access point identification data compression component 132, and access point geo-location data compression component 134.

It is to be appreciated that this particular arrangement of modules 130, 132 and 134 illustrated in the processor 120 of the FIG. 1 embodiment is presented by way of example only, and alternative arrangements can be used in one or more other embodiments. For example, the functionality associated with the modules 130, 132 and 134 in other embodiments can be combined into a single module, or separated across a number of modules. By way of further example, multiple distinct processors can be used to implement different ones of the modules 130, 132 and 134, or portions thereof.

Also, at least portions of the access point constellation determiner 130, access point identification data compression component 132, and access point geo-location data compression component 134 can be implemented at least in part in the form of software that is stored in memory 122 and executed by processor 120.

Further, an example process utilizing access point constellation determiner 130, access point identification data compression component 132, and access point geo-location data compression component 134 of the geo-location server 105 in network 100 is described herein in greater detail.

It is to be understood that the particular set of elements shown in FIG. 1 for geo-location data compression and transmission involving user devices 102 of network 100 is depicted by way of illustrative example only, and in one or more other embodiments, additional or alternative elements may be used.

By way merely of example, in one or more other embodiments, the geo-location server 105 can be eliminated and associated elements such as access point constellation determiner 130, access point identification data compression component 132, and access point geo-location data compression component 134 can be implemented elsewhere in network 100.

At least one embodiment includes determining access point geo-location data, compressing access point geo-location data, and transmitting compressed access point geo-location data (optionally in conjunction with geo-location data pertaining to the requesting device) to a requesting device (such as user device 102), thereby enabling the requesting device to carry out subsequent geo-location determinations using the provided compressed data.

In one or more embodiments, if a server (such as geo-location server 105) is aware or has determined the geo-location of one or more access points, the server can ascertain geo-location information for one or more additional proximate access points. As such, if the server can return to a requesting device (for example, a device—such as user device 102—requesting its own geo-location position from the server) multiple of these additional access points along with the device's position in space, the server can empower the requesting device to carry out its own geo-location/positional fix whenever the device wishes (so long as the requesting device is within a given proximity of the provided access points). Additionally, in such an embodiment, the requesting device would not need to communicate with the cloud to carry out the subsequent geo-location/positional fix determinations.

Further, the quality of the constellation of access points provided to the requesting device (by the server) can provide considerable value to the process of determining (locally) a positional fix of the requesting device. As used herein, a "constellation" refers to a particular grouping of one or more access points, with respect to the shape, density and clustering of the points therein. Additionally, the above-noted "value" can include increased accuracy, wherein the better the constellation returned by the server (for example, the more evenly spaced the access points whose data are returned to the requesting device), the better the requesting device will subsequently be able to accurately determine its position. As should be appreciated, in one or more embodiments, the quality of a constellation can depend on multiple variables beyond and in addition to access point density. Multiple additional considerations and/or variables can be utilized in qualifying and/or comparing constellations.

In one or more embodiments, a server can examine and/or detect multiple access points (for example, all possible access points within a given proximity and/or radius) and perform one or more filtering functions on the detected access points. Such filtering functions can include, for example, filtering based on the (likely) quality of the access points (which can include, for instance, the age of the access points (are they likely to still exist?), the strength of the access points, etc.). Additionally, such filtering functions can also include, for example, filtering based on the quality of the particular and/or possible constellations (that is, the particular combinations of access points to be potentially provided to the requesting device). By way of further example, a server can iterate through all possible sets (constellations) of access points and select the most optimal set (constellation) of access points in terms of selecting the constellation that requires the least number of access points (and thus will allow the smallest data-sized response) that is likely to allow the requesting device to generate sufficiently accurate positional fixes.

Further, in accordance with one or more embodiments, the server can be aware of and/or can determine the geo-location of the requesting device. Also, because at least one embodiment can include primarily targeting pedestrian ambulation, the server need not necessarily return to the requesting device (in response to a geo-location request) a Gaussian distribution of access points (within a given radius of the user device). For example, if the server detects that there are many access points, and if the server has an understanding of and/or has learned historical vectors pertaining to pedestrians ambulating within the region/area in question, the server can determine a likelihood that users (and, correspondingly, their user devices) commonly move in certain directions and/or towards (or away from) certain locations (relevant to the requesting device's location/position). Based on such determinations, the server can additionally infer (without local or satellite information) that there exists one or more boundary conditions (for example, a wall, a body of water, etc.) within the relevant area surrounding the requesting device's location/position. In such an embodiment, the server will therefore not provide to the user any access points corresponding to and/or associated with the one or more inferred boundary conditions (because it is unlikely that the user will travel or be able to travel to the locations associated with those access points). Additionally, historical information pertaining to user movement can be learned by the server over time and/or over multiple iterations of geo-location requests and responses in connection with one or more user devices.

Assuming infinite memory on a requesting device, it would be optimal for the requesting device to have a complete and/or maximal set of access points to utilize for subsequent (local) geo-location determinations. However, because of limited memory, time-on-air considerations, data cost considerations, power considerations, etc., such an optimal outcome is not plausible, and as such, sub-sets of access points can be selected by the server and provided to the requesting device in response to an initial geo-location request.

Accordingly, in one or more embodiments, the server examines multiple possible constellation configurations, and ultimately selects one or more of the constellations to send to the requesting device in response to a geo-location request. In such an embodiment, the server can determine or be informed of which (if any) user devices are associated with the requesting device during a given usage session. For example, a group of friends skiing on a mountain (or attending a concert, hiking on a trail, attending a festival, etc.) can link their user devices together and associate as a group to the server.

Additionally, in at least one embodiment, the server can be configured to incorporate the concept of an intention to return, whereby users (with their corresponding devices) inherently seek to return to a similar point of origin, to a location common to other users in a particular group, etc. Also, in one or more embodiments, the server has learned and/or is configured to learn the last-known location of each of the user devices in an established group of devices. Also, in at least one embodiment, the devices that constitute a group can be configured to associate with each other and to indicate to the server that each of the devices is a member of the group. Accordingly, in such an embodiment, the server, in determining which constellation of access points to provide to a requesting device, can consider and potentially favor access points proximate to the other devices in the requesting device's group, access points proximate to a likely path of movement (or vector) associated with other devices in the requesting device's group, etc.

Also, in one or more embodiments, the server can be configured to retain (and store) information regarding which device has received (from the server) information pertaining to which access points. Accordingly, if a subsequent response from the server is requested by a user device, the server can avoid sending duplicate access point information to that device based on the above-noted stored information.

In connection with selecting one or more constellations to send to a requesting device in response to a geo-location request, one or more embodiments include sending to the requesting device information identifying and/or describing the corresponding access points and geo-location coordinates via a reduced response set. Specifically, as further described below, such an embodiment can include compressing the MAC address attributed to each access point, compressing the latitude-longitude values attributed to each access point by converting such values to polar coordinates, and converting the polar coordinates to a position on a spiral data structure.

Accordingly, one or more embodiments include compressing the MAC address associated with each access point by taking a limited hash thereof. As would be appreciated by one skilled in the art, the MAC address of an access point is sufficiently unique to differentiate that access point from all other access points. That said, in one or more embodiments, a requesting device may only need to differentiate the access points within a locally-defined area. In such an embodiment, the server can provide, to the requesting device, a reduced hash of the identifying feature (such as, for example, the MAC address).

Further, at least one embodiment includes iterating through all possible combinations of appropriate and/or acceptable constellations within a given set of access points to identify the access points that have dissimilar hashes of MAC addresses. By way merely of example, assume that MAC addresses for a given set of four access points contain four-digit codes as follows: 4095, 3095, 2094, and 1012. Further, in this example, assume that the server is attempting to select three of these access points to form a constellation to send to a requesting device. Consequently, in one or more embodiments, the server can select the access points corresponding with codes 2094 and 1012, and one of the access points corresponding with codes 4095 and 3095. Because 4095 and 3095 end in the same two digits, one of those codes can be selected in combination with codes 2094 and 1012, and the three selected codes can be further hashed to two-digit codes 95, 94 and 12. Subsequently, these further-reduced hashes can be sent to the requesting device (thereby reducing the size of the data being transferred). In other words, in the above-noted example, of the four possible access points considered, the three selected codes can be uniquely identified by only their two trailing digits. In such an embodiment, the parameters of the heuristic chosen by the server are also sent to the requesting device, in order that the requesting device is able to use the reduced hashes to identify those access points which the server delineated in its response.

Accordingly, in an example embodiment, such as detailed above via the noted example, the complete set of appropriate and/or acceptable constellations can be iterated through (by the server) in order to determine and identify the minimum hash size to uniquely identify each corresponding access point in the constellation(s).

Additionally, latitude and longitude values can be sent with each MAC address in responding to a user device's request for a geo-location determination. As such, in one or more embodiments, rather than specifying Cartesian coordinates on an axis, polar coordinates can be implemented, and can function, for example, as follows. Given origin point (0, 0), consider a vector that is x magnitude out and 70 degrees relative to the origin point. Accordingly, at least one embodiment includes determining a polar coordinate by calculating, from a given origin point, an angle going outwards, and a magnitude value (such as, for instance, a distance from the origin point). For example, using the location of the requesting device as the origin point (and true north as 0 degrees), a polar coordinate for a given access point could be determined/represented as 270 degrees and five feet left of the origin point.

By way of illustration, consider the following example embodiment, wherein the server, in response to an initial geo-location request from a requesting device, provides only a first location (the location of the requesting device) as an absolute position (for example, in the form of a latitude-longitude pair). The location of each access point (of the selected constellation) can then be provided by the server to the requesting device as a position relative to the initial/absolute position of the requesting device. For example, the access point locations can be provided as a multi-dimensional array of access point hashes, polar coordinate angles and polar coordinate vector magnitudes.

By way merely of illustration, consider a square (square A) having sides that are each exactly 100 feet in length. Further, assume that the requesting device is positioned in the center of the square, and an access point is positioned on each of the four corners of the square. The requesting device observes the four access points and sends identification information pertaining to the four access points to the server. Consider, also, that there is another square (square B) that encompasses square A, the sides of square B are each 200 feet in length, and the center of square A and square B are the same point. There are also access points on all four corners of Square B, but the requesting device cannot see any of the access points of square B. The server determines which of the above-noted eight access points should be returned to the requesting device in conjunction with a geo-location request. Triangulation techniques, using sine, cosine and related functions, can be used to determine the angle and distance from one point to another. By way of example, a simplified version of the server's response, using general polar coordinates (that is, not a spiral data structure) could contain the following array: {A1, 45, 70.7}, {A2, 135, 70.7}, {A3, 225, 70.7), {A4, 305, 70.7}, {B1, 45, 141} {B2, 135, 141}, {B3, 225, 141}, {B4, 305, 141}.

Figure 2:
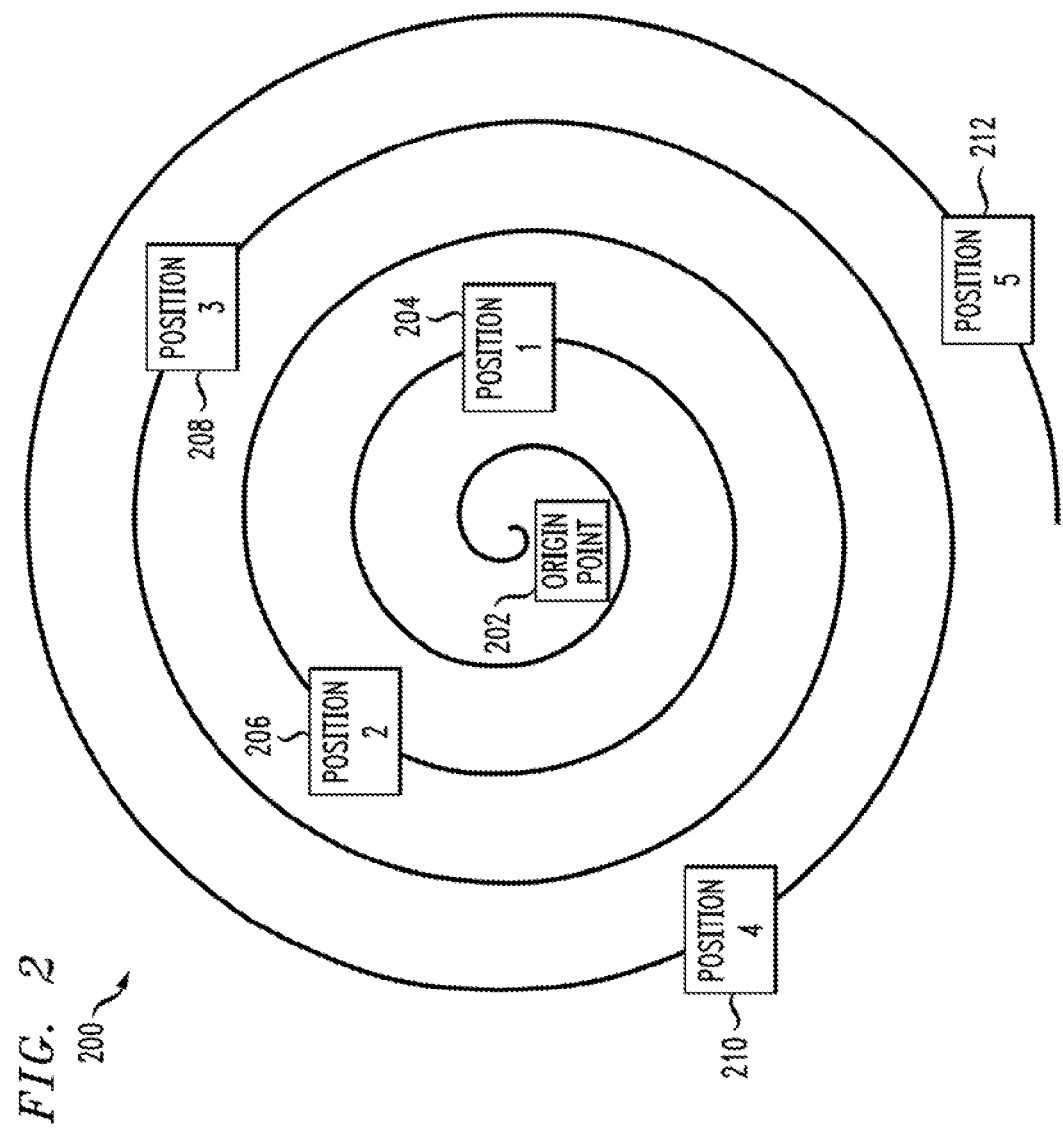
FIG. 2 is a diagram illustrating a spiral data structure utilized in an example embodiment.

FIG. 2 is a diagram illustrating a spiral data structure 200 utilized in an example embodiment. As illustrated in FIG. 2, at least one embodiment implements and utilizes a single dimension spiral data structure for considering and/or representing geo-location data. In such an embodiment, the spiral data structure 200 is configured to have a known and predictably increasing radius, upon which an array of points is positioned, such as origin point 202, Postion1 204, Position2 206, Position3 208, Position4 210 and Position5 212. Additionally, in such an embodiment, the distance between each of the points (that is, the density of the points on the spiral data structure) increases in a known and exponential manner. Accordingly, in such an embodiment, geo-location, as a polar vector, can be defined on a single axis, and the precision and accuracy of the geo-location determination can be scaled depending upon the underlying geometric assumptions of the spiral structure. Additionally, in such an embodiment, the user devices (and server) can be configured to interpret such spiral data structures.

Consequently, one number (the numerical position on the spiral data structure) can be associated with a compressed MAC address to represent a given access point. To convert a latitude/longitude value (that is, a coordinate to encode) into a single-number spiral position, one or more techniques can be implemented. By way merely of example, one or more embodiments include the following steps (carried out by the server). First, the server iterates through the array of points on the spiral, determines their absolute position in space (as can be known from their relative position to a known origin point), and stores these values in a table. Then, the server performs a distance calculation between the coordinate to encode each entry in the table. Additionally, these distance values are sorted (for example, from smallest to largest). The table entry that corresponds to the smallest distance between its spiral point and the value to encode provides the closest approximation of its position. The server then associates this access point entry in its response with the array index of this corresponding (most closely approximate) position.

As such, in lieu of sending, to a requesting device for each of potentially multiple access points, a combination of (i) a full MAC address (for example, 00-14-22-01-23-47), (ii) a full longitude value (for example, 37° 41'26"N 97° 20'0"W), and (iii) a full latitude value (for example, 37° 41'26"N 97° 20'0"W), at least one embodiment includes sending, to the requesting device for each access point, (a) the minimum uniquely-identifying hash size (for example, a reduced hash such as "95" in the above-detailed example) to uniquely identify each corresponding access point in the constellation(s) and (b) a single numerical value (such as "5," indicating point Position5 on the spiral data structure) that represents the latitude and longitude values of the access point relative to the location of the requesting user device or some other known and/or pre-determined location. In one or more embodiments, the spiral data structure can be oriented relative to the current location of the requesting user device, can be oriented relative to due north, etc.

By way of illustration of an example embodiment, consider the following. A requesting device requests an initial geo-location determination (of the requesting device) from a server. In the first response packet from the server, an absolute position is defined for the requesting device and/or one or more access points. In one or more subsequent responses, geo-location positioning for the requesting device and/or one or more access points can be defined as a spiral data structure relative to the originally-defined absolute position from the first response packet.

Such an example embodiment can increase the precision of access points proximate to the user device's current position. As such, as the requesting device moves farther away from the originally-defined absolute position, the server can provide more diffuse positional possibilities.

Also, in one or more embodiments, a response generated by the server can include a table of access points, and the table can include, for each access point, a compressed hash and a number that indicates a position on an array (for example, a spiral data structure having a geometry that is known both to the server and to the requesting device). Using such a response, as detailed further below, the requesting device can subsequently carry out and execute its own geo-location requests.

In at least one embodiment, a requesting device can convert a geo-location response (as detailed herein) generated/provided by the server into a format that the device can then use for local calculations. For example, the requesting device, based on the response from the server, can identify the geo-location of certain access points. Accordingly, in one or more embodiments, the requesting device can compare the information provided by the server (compressed MAC addresses and corresponding spiral data structure position numbers, for example) to information pertaining to access points that the requesting device can actually detect at that moment (via, for example, a Wi-Fi scan).

By way merely of example, assume that the response from the server included information attributed to Access Point 1, Access Point 2, Access Point 3, and Access Point 4. Further assume that the requesting device subsequently seeks to re-determine its geo-location, and the device scans the surrounding area and determines that Access Point 1 and Access Point 2 are strongly detected while Access Point 3 is no longer detected. Accordingly, the requesting device can infer and/or determine its own geo-location positioning based on this detected information relative to Access Point 1, Access Point 2, and Access Point 3. By way of further example, assume that the requesting device subsequently detects Access Point 4 (wherein the device had previously been unable to detect Access Point 4), providing additional information by which the requesting device can infer and/or determine its geo-location positioning.

Further, in at least one embodiment, the requesting device can be configured to carry out and execute such geo-location requests locally as many times as the device (or the user of the device) wants or is capable of computing. In accordance with such an embodiment, the energy costs to the device associated with receiving data (listening and/or detecting) are lower than the energy costs to the device associated with transmitting data. As such, the local geo-location determinations require significantly less data costs and network on-air time than the initial request-response communication sequence between the requesting device and the server (and as in conventional approaches).

FIG. 3 is a flow diagram of a process for data compression in an illustrative embodiment. It is to be understood that this particular process is only an example, and additional or alternative processes can be carried out in other embodiments.

In this embodiment, the process includes steps 300 through 308. These steps are assumed to be performed by the processor 120 (of geo-location server 105) utilizing modules 132 and 134.

Step 300 includes compressing at least a first portion of geo-location information attributed to each of one or more access points via one or more hash reduction techniques, wherein an access point comprises a networking hardware device having identifiable geo-location properties. The at least a first portion of geo-location information attributed to each of the one or more access points can include a media access control address attributed to each of the one or more access points. Additionally, the one or more hash reduction techniques can include identifying one or more access points that have dissimilar hashes of media access control address attributed thereto. Further, the one or more hash reduction techniques can include determining a minimum hash size to uniquely identify each corresponding access point in a designated group of access points.

Step 302 includes converting at least a second portion of geo-location information attributed to each of the one or more access points to polar coordinates. The at least a second portion of geo-location information attributed to each of the one or more access points can include latitude-longitude, values attributed to each of the one or more access points. In one or more embodiments, converting the at least a second portion of geo-location information attributed to each of one or more access points to polar coordinates includes calculating, from a given origin point, an angle extending outwards, and a magnitude value. In such an embodiment, the given origin point includes a geo-location attributed to a requesting user device and the magnitude value includes a distance from the given origin point. Additionally, in such an embodiment, calculating, from the given origin point, the angle extending outwards and the distance, includes implementing one or more triangulation techniques (such as sine function a cosine function, etc.).

Step 304 includes converting, for each of the one or more access points, the polar coordinates attributed thereto to a position on a one-dimensional data structure configured to have one or more predetermined geometric properties. In one or more embodiments, the one-dimensional data structure includes a one-dimensional spiral data structure. In such an embodiment, the one or more predetermined geometric properties of the one-dimensional spiral data structure include a radius increasing at a predetermined rate, as well as a predetermined density of positions on the one-dimensional spiral data structure. The predetermined density of positions can include predetermined distances between positions on the one-dimensional spiral data structure, wherein the predetermined distances increase in an exponential manner as the positions extend outward from an origin point of the one-dimensional spiral data structure. Additionally, in at least one embodiment, the one-dimensional spiral data structure is oriented relative to a geo-location of a requesting user device. Further, in one or more embodiments, the data structure can be a multi-dimensional data structure.

Step 306 includes generating a compressed access point geo-location data output comprising the compressed at least first portion of geo-location information attributed to each of the one or more access points and the position on the one-dimensional data structure attributed to each of the one or more access points. One or more embodiments include assigning a numerical value to each position on the one-dimensional spiral data structure. Also, in such an embodiment, the compressed access point geo-location data output includes a table comprising, for each of the one or more access points, the numerical value assigned to the position on the one-dimensional spiral data structure attributed to the given access point and the compressed media access control address attributed to the given access point. Further, generating the compressed access point geo-location data output can include generating a data packet comprising the table.

Step 308 includes outputting the compressed access point geo-location data output to at least one user device. Also, in one or more embodiments, steps 300 through 308 are carried out by at least one computing device. In such an embodiment, the at least one computing devices includes a server (such as, for example, geo-location server 105), and also in such an embodiment, the one or more predetermined geometric properties of the one-dimensional data structure are known to the server and to a requesting user device (such as, for example, user device 102).

Other techniques can be used in association with one or more embodiments of the disclosure. Accordingly, the particular processing operations and other network functionality described in conjunction with the flow diagram of FIG. 3 and the above-noted techniques are presented by way of illustrative example only, and should not be construed as limiting the scope of the disclosure in any way. For example, the ordering of the process steps may be varied in one or more other embodiments, or certain steps may be performed concurrently with one another rather than serially. Also, the process steps or subsets thereof may be repeated periodically in conjunction with respective distinct instances of geo-location data requests with respect to different users and/or user devices.

The above-described example embodiments provide significant advantages relative to conventional approaches. For example, one or more embodiments include compressing access point geo-location via hash reduction as well as converting polar coordinates to a one-dimensional spiral data structure of known/established geometric parameters. Additionally, one or more embodiments include enabling a requesting device to carry out geo-location determinations locally using an initial compressed access point geo-location data packet.

It is to be appreciated that the foregoing advantages are illustrative of advantages provided in certain embodiments, and need not be present in other embodiments.

Additionally, the networks disclosed herein can be implemented, for example, using one or more processing platforms. Such a processing platform can include, by way of example, at least one processing device comprising a processor coupled to a memory.

In one or more embodiments, portions of a network as disclosed herein can illustratively include cloud infrastructure. The cloud infrastructure, in at least one such embodiment, can include a plurality of containers implemented using container host devices, and/or can include container-based virtualization infrastructure configured to implement Docker containers or other types of Linux containers.

The cloud infrastructure can additionally or alternatively include other types of virtualization infrastructure such as virtual machines implemented using a hypervisor. Additionally, the underlying physical machines include one or more distributed processing platforms that include one or more storage systems.

Such cloud infrastructure as described above can, by way of example, represent at least a portion of one processing platform. Another example of such a processing platform can include, as similarly detailed above in connection with FIG. 1, a plurality of processing devices which communicate with one another over a network. As yet another processing platform example, portions of a given processing platform in one or more embodiments can include converged infrastructure.

The particular processing platforms described above are presented by way of example only, and a given network such as network 100 can include additional or alternative processing platforms, as well as numerous distinct processing platforms in any combination, with each such platform comprising one or more computers, servers, storage devices and/or other processing devices.

Further, in accordance with one or more embodiments, processing devices and other network components can communicate with one another using a variety of different communication protocols and associated communication media.

It should again be emphasized that the embodiments of the disclosure described herein are presented for purposes of illustration only. Many variations may be made in the particular arrangements shown. Moreover, the assumptions made herein in the context of describing one or more illustrative embodiments should not be construed as limitations or requirements of the disclosure, and need not apply in one or more other embodiments. Numerous other alternative embodiments within the scope of the appended claims will be readily apparent to those skilled in the art.

What is claimed is:

1. A computer-implemented method comprising:
   compressing at least a first portion of geo-location information attributed to each of one or more access points via one or more hash reduction techniques, wherein an access point comprises a networking hardware device having identifiable geo-location properties;
   converting at least a second portion of geo-location information attributed to each of the one or more access points to polar coordinates;
   converting, for each of the one or more access points, the polar coordinates attributed thereto to a position on a one-dimensional data structure configured to have one or more predetermined geometric properties;
   generating a compressed access point geo-location data output comprising (i) the compressed at least first portion of geo-location information attributed to each of the one or more access points and (ii) the position on the one-dimensional data structure attributed to each of the one or more access points; and
   outputting the compressed access point geo-location data output to at least one user device;
   wherein the method is carried out by at least one computing device.

2. The computer-implemented method of claim 1, wherein the at least a first portion of geo-location information attributed to each of the one or more access points comprises a media access control address attributed to each of the one or more access points.

3. The computer-implemented method of claim 2, wherein the one or more hash reduction techniques comprises identifying one or more access points that have dissimilar hashes of media access control address attributed thereto.

4. The computer-implemented method of claim 1, wherein the one or more hash reduction techniques comprises determining a minimum hash size to uniquely identify each corresponding access point in a designated group of access points.

5. The computer-implemented method of claim 1, wherein the at least a second portion of geo-location information attributed to each of the one or more access points comprises latitude-longitude values attributed to each of the one or more access points.

6. The computer-implemented method of claim 1, wherein converting the at least a second portion of geo-location information attributed to each of one or more access points to polar coordinates comprises calculating, from a given origin point, an angle extending outwards, and a magnitude value.

7. The computer-implemented method of claim 6, wherein the given origin point comprises a geo-location attributed to a requesting user device.

8. The computer-implemented method of claim 6, wherein the magnitude value comprises a distance from the given origin point.

9. The computer-implemented method of claim 8, wherein calculating, from the given origin point, the angle extending outwards and the distance, comprises implementing one or more triangulation techniques.

10. The computer-implemented method of claim 9, wherein the one or more triangulation techniques comprise at least one of a sine function and a cosine function.

11. The computer-implemented method of claim 1, wherein the one-dimensional data structure comprises a one-dimensional spiral data structure.

12. The computer-implemented method of claim 11, wherein the one or more predetermined geometric properties of the one-dimensional spiral data structure comprises a radius increasing at a predetermined rate.

13. The computer-implemented method of claim 11, wherein the one or more predetermined geometric properties of the one-dimensional spiral data structure comprises a predetermined density of positions on the one-dimensional spiral data structure.

14. The computer-implemented method of claim 13, wherein the predetermined density of positions comprises predetermined distances between positions on the one-dimensional spiral data structure, wherein the predetermined distances increase in an exponential manner as the positions extend outward from an origin point of the one-dimensional spiral data structure.

15. The computer-implemented method of claim 11, wherein the one-dimensional spiral data structure is oriented relative to a geo-location location of a requesting user device.

16. The computer-implemented method of claim 1, comprising:
assigning a numerical value to each position on the one-dimensional spiral data structure.

17. The computer-implemented method of claim 16, wherein the at least a first portion of geo-location information attributed to each of the one or more access points comprises a media access control address attributed to each of the one or more access points, and wherein the compressed access point geo-location data output comprises a table comprising, for each of the one or more access points, the numerical value assigned to the position on the one-dimensional spiral data structure attributed to the given access point and the compressed media access control address attributed to the given access point.

18. The computer-implemented method of claim 17, wherein generating the compressed access point geo-location data output comprises generating a data packet comprising the table.

19. A non-transitory processor-readable storage medium having stored therein program code of one or more software programs, wherein the program code when executed by at least one processing device causes the at least one processing device:
to compress at least a first portion of geo-location information attributed to each of one or more access points via one or more hash reduction techniques, wherein an access point comprises a networking hardware device having identifiable geo-location properties;
to convert at least a second portion of geo-location information attributed to each of the one or more access points to polar coordinates;
to convert, for each of the one or more access points, the polar coordinates attributed thereto to a position on a one-dimensional data structure configured to have one or more predetermined geometric properties;
to generate a compressed access point geo-location data output comprising (i) the compressed at least first portion of geo-location information attributed to each of the one or more access points and (ii) the position on the one-dimensional data structure attributed to each of the one or more access points; and
to output the compressed access point geo-location data output to at least one user device.

20. An apparatus comprising:
at least one processing device comprising a processor coupled to a memory;
the at least one processing device being configured:
to compress at least a first portion of geo-location information attributed to each of one or more access points via one or more hash reduction techniques, wherein an access point comprises a networking hardware device having identifiable geo-location properties;
to convert at least a second portion of geo-location information attributed to each of the one or more access points to polar coordinates;
to convert, for each of the one or more access points, the polar coordinates attributed thereto to a position on a one-dimensional data structure configured to have one or more predetermined geometric properties;
to generate a compressed access point geo-location data output comprising (i) the compressed at least first portion of geo-location information attributed to each of the one or more access points and (ii) the position on the one-dimensional data structure attributed to each of the one or more access points; and
to output the compressed access point geo-location data output to at least one user device.

\* \* \* \* \*